Feb. 11, 1936.                    C. OPOLO                    2,030,710
                        FLEXIBLE AXLE FOR VEHICLES
                         Filed March 10, 1934              2 Sheets-Sheet 1
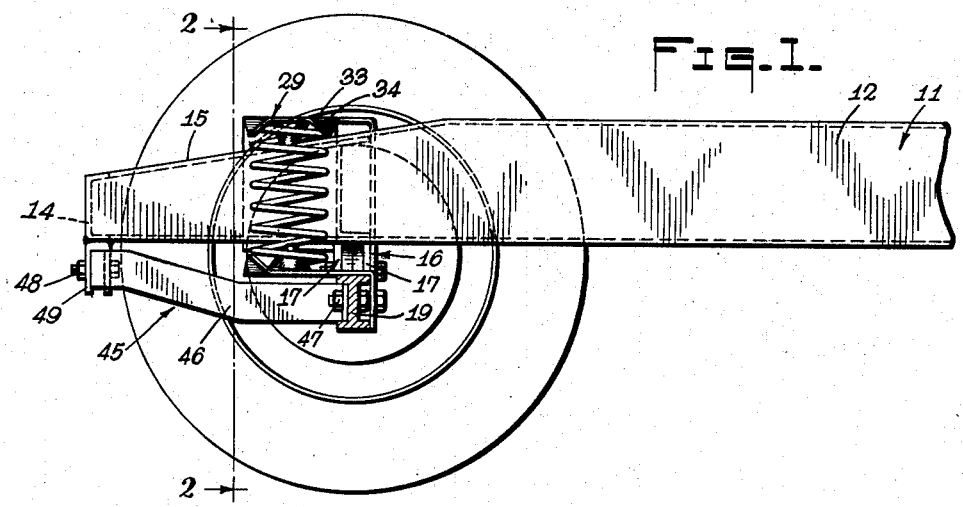
INVENTOR
CHARLES OPOLO
by Hazard and Miller
ATTORNEYS.

Feb. 11, 1936. C. OPOLO 2,030,710

FLEXIBLE AXLE FOR VEHICLES

Filed March 10, 1934 2 Sheets-Sheet 2

INVENTOR
CHARLES OPOLO
by Hazard and Miller
ATTORNEYS.

Patented Feb. 11, 1936

2,030,710

UNITED STATES PATENT OFFICE 2,030,710

FLEXIBLE AXLE FOR VEHICLES

Charles Opolo, Culver City, Calif.

Application March 10, 1934, Serial No. 714,971

9 Claims. (Cl. 267—20)

My invention relates to a divided axle for front wheels of power driven vehicles which may also be applied to all the wheels of a trailer, and in which each section of the divided axle has an independent movement with its own spring connection to the vehicle's frame. Therefore, one of the wheels may react upwardly to a bump or downwardly to a depression in the road without affecting the other side of the axle or the front wheel. Hence, the road shocks are, to a great extent, taken up by the spring suspension of individual wheels instead of the reaction of one wheel to a bump or depression causing a relative movement of the axle as a whole in relation to the frame of the vehicle.

A more specific object and feature of my invention is forming an axle in two parts in which such parts are pivoted together, and each half axle has a spring connection to the vehicle frame.

Another detail relates to pivoting the inner ends of each half axle to a single pivot, which pivot is connected to the vehicle frame, therefore each half axle may have an up and down movement independently of the other in reference to the frame, and each half axle has its own spring connection to the frame.

Another object and feature of my invention is forming the spring suspension with compensating types of springs so that when a spring is depressed by one of the wheels striking a bump after a certain amount of compression, an auxiliary spring is brought into action to limit the compression, likewise if one of the wheels drops into a hole in the road and allows the main spring to extend, the auxiliary spring resists this extension and thus the auxiliary springs function somewhat as a shock absorber by resisting the movement of the main spring after it has moved either into compression or extension a substantially predetermined amount.

In one form of my invention, preferably when using coil springs, a further feature of invention is in providing a pivoted radius rod connection from each half axle to the vehicle frame. This is accomplished by rigidly securing a radius rod to each half axle preferably adjacent its other portion and pivotally connecting the inner ends of the two radius rods to a common center pivot which is attached to the vehicle frame.

Another detailed feature in connection with the pivoted half axles and radius rods is that the single pivot for the axles and the radius rods are on the same axis considered longitudinally of the vehicle.

Another feature of my invention as it relates to a spring suspension using fore and aft leaf springs, is that the radius rods may be omitted and the leaf springs maintain the proper alignment of the axle sections and frame. In this type of construction, the leaf springs are preferably pivotally connected to the vehicle frame at one end and pivotally connected by a shackle on the opposite end, the center part of each spring being rigidly attached to a half axle section.

Another feature of my invention in relating to the use of leaf springs, is in having compensating coil springs to resist the compression or extension of the leaf springs after they have flexed a predetermined amount and thus function somewhat as shock absorbing auxiliary springs.

A feature of my invention in one form is that the half axles at their inner ends are pivotally connected together but such pivotal connection is disconnected from the vehicle frame. The main connection of each half axle to the frame of the vehicle is by a pivotal connection to a main spring mounting, such main springs being attached to the side members of the vehicle. Together with this construction I employ auxiliary springs connecting between the inner portions of each half axle and the vehicle frame.

My invention is illustrated in connection with the accompanying drawings, in which:

Fig. 1 is a vertical longitudinal section taken on the line 1—1 of Fig. 2 in the direction of the arrows.

Fig. 2 is a vertical transverse section on the line 2—2 of Fig. 1 in the direction of the arrows.

Fig. 3 is a horizontal section on the line 3—3 of Fig. 2 in the direction of the arrows.

Figure 4:
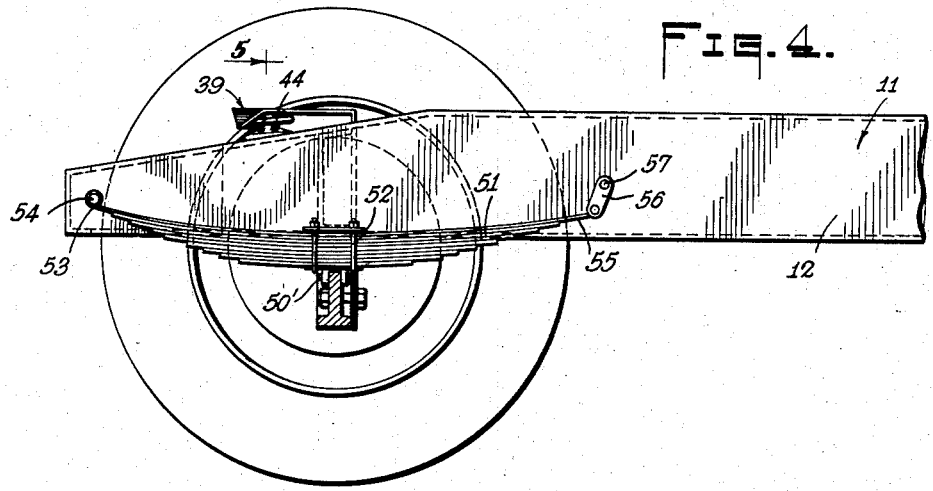
Fig. 4 is a vertical longitudinal section of a modification taken on the line 4—4 of Fig. 5 in the direction of the arrows.

Referring first to the construction of Figs. 1, 2, and 3, I employ a rigid vehicle frame 11 which is illustrated as having side beams 12, a cross partition rail 13, and a front end rail 14. The beams and rails are shown as formed with channels suitably connected. The forward end of the beam 12 has a taper 15 at the center of the cross rail 13 and depending therefrom there is a pivot or hinge bracket 16 formed with a pair of ears 17.

The axle 18 is illustrated as having two parts or arms 19, these being shown as of I cross section. Their inner ends are pivoted to the pivot bracket by means of a pintle bolt 20 extending through the ears and through the inner ends of the axles. The axles have a straight section with a flat upper surface 21 and towards the outer end there is a sharp upcurved section 22 terminating in a hub 25. The wheel spindle 26 has a yoke 27 and a spindle bolt 28 extends through the arms of the yoke and the hub 25, thus allowing the front or steering wheels to swivel on the hub and thus on the axle.

This construction may be applied to the mounting of the front steering wheels of a vehicle propelled by the rear wheels and also to the front wheels of a trailer. The rear axle construction for a trailer would omit the hub 25 and the yoke and spindle bolt 28.

In my construction I employ spring mounting brackets 29. Each bracket is shown as having a vertical plate 30, an upper horizontal plate 31, and a lower horizontal plate 32. These brackets are rigidly secured to the side beams 12, also preferably to the cross rail 13 at the location where these intersect. The upper horizontal section 31 has a spring seat 32. This is provided with a cone-shaped depression 33 and with downwardly bent tabs 34. There is also a spring seat 35 on the outer portion of the horizontal plate 32 formed in the same manner as the spring seat 32.

On the outer portion of each half axle 19 there is a lower spring seat plate 36 which is illustrated as bent in an L shape with a vertical web 37. This plate is secured to the axle by bolts 38. A main compression spring 39 is fitted between the seat 36 on the half axle, and the seat 32 is secured in a fixed position to the vehicle frame. All of the spring seats may be of the same character.

A movable spring seat bracket 39 consists of a vertical plate 40 bolted at 41 to each half axle and is located between the side beams 12. At the top of the vertical plate 40 there is a horizontal plate 42 which has a spring seat construction 43 of the same type as the seat 35. Between these seats there is an auxiliary coil spring 44. The spring constructions on both sides of the center line of the vehicle are the same.

In order to carry the longitudinal strains and shocks I employ a radius rod construction 45 employing two rods 46, each rigidly secured at 47 to one of the half axles adjacent its outer portion and both being secured by a pivot bolt 48 to a depending bracket 49 having a pair of ears, such bracket being attached to the front rail 14. This radius rod construction takes up the longitudinal strains and shocks between the wheels, their axles and the frame.

The manner of operation and functioning of the axle spring assembly above described is as follows:

Presuming one of the wheels strikes a bump which will cause one of the half axles to be elevated, this will compress the main spring 39 on one side and extend the auxiliary spring 44 on the same side. An opposite action occurs should one of the wheels drop into a hole in the road, in which case the main spring 39 will become extended and the auxiliary spring 44 compressed; thus, one wheel may react to irregularities of the road and its half axle oscillate vertically without affecting the other half axle and its wheel. This therefore gives an increased independent spring mounting for the steering wheels of a motor car or for all of the wheels of a trailer.

Figure 5:
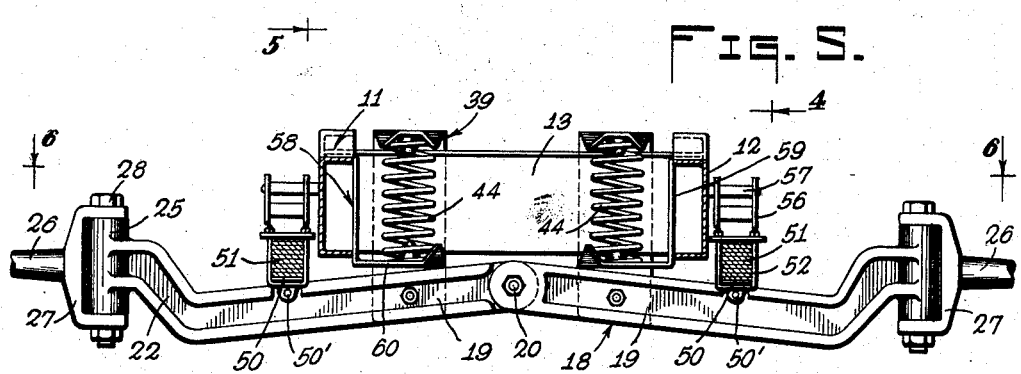
Fig. 5 is a vertical transverse section on the line 5—5 of Fig. 4 in the direction of the arrows, the coiled springs being shown in elevation.
Figure 6:
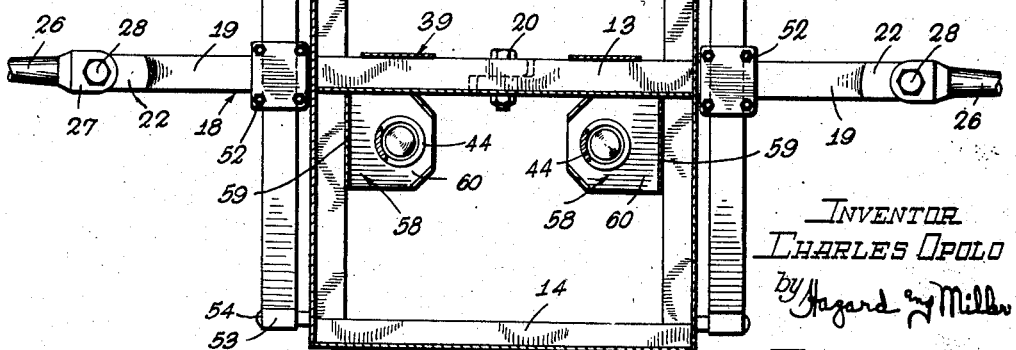
Fig. 6 is a horizontal section on the line 6—6 of Fig. 5 in the direction of the arrows.

In the construction of Figs. 4, 5 and 6, the main vehicle frame is constructed in the manner above described, as are the half axles, except in this case, each half axle is provided with a spring seat 50 pivoted at 50' on which is mounted a leaf spring 51, each leaf spring being secured to its seat by a U-shaped clamping bolt 52. Each spring is illustrated as secured at its forward end 53 to a swivel pin 54 secured to a side beam 12. The rear end 55 of each spring is secured to a swinging shackle 56 attached to supporting pin 57 extending outwardly from one of the beams 12. In this construction, it is not necessary to use the radius rods as the leaf springs with their connections to the side beams take up the longitudinal thrusts and strains.

The axle arms 19 are pivotally connected together by the pintle 20 but are disconnected from the cross rail 13 of the vehicle frame. The main attachment of the half axles to the vehicle frame is through the leaf springs 51 having the hinged connections by the spring seat 50 and the longitudinal pivot 50'.

Spring mounting brackets 58 employ a vertical plate 59 each attached to a beam 12 and having a horizontal spring seat plate 60. There is also a spring seat bracket 39 similar to that described in connection with Figs. 1, 2 and 3 attached to each half axle and between the seats of the bracket 39 and the seat 60 there is a compensating spring 44. This has the same mounting as shown in Figs. 1, 2 and 3. In the operation of the axle and spring assembly of Figs. 4, 5 and 6, if one wheel contacts a bump, the wheel will move upwardly relative to the vehicle frame and hence swing one of the half axles on its center pivot. This will compress one of the leaf springs on one side and will extend the auxiliary spring 44 on the same side. This action will take place without affecting the half axle on the other side or the springs of such other half axle. The reverse action takes place when one of the wheels drops in a depression in the road, that is, the leaf spring on one side is extended and the auxiliary spring 44 compressed.

The auxiliary springs in both forms of my construction are considerably lighter than the main springs and function to a great extent to prevent a rebound of the vehicle frame. For instance, presuming one wheel strikes a bump and compresses its main spring, this action also extends the auxiliary spring on the same side of the vehicle. However, if the vehicle frame is thrown upwardly on this side, the auxiliary spring on the side of the wheel which has passed over the bump immediately compresses and resists the upward action of the frame. It also resists the dropping of a wheel into a depression, for while this action would extend the main spring, it compresses the auxiliary spring and therefore tends to maintain the vehicle frame substantially level while each axle may ride over bumps or drop into depressions in the road.

Various changes may be made in the details of construction without departing from the spirit or scope of the invention as defined by the appended claims.

I claim:

1. In a vehicle, a vehicle frame having a transverse member, two half axles each pivoted together and pivoted to the under side of the transverse member, each half axle having a spring seat adjacent its outer portion, an upper spring seat extending laterally from the upper portion of the vehicle frame, and a coiled spring between the said seats, the vehicle frame having a second transverse upper member, a pair of radius rods each rigidly secured to a half axle adjacent its outer portion and each pivoted to the second transverse member and to each other, the pivots of the half axles and of the radius rods being in the same vertical plane, an upper spring seat secured to each half axle section, a lower spring seat secured to the vehicle frame, and auxiliary coiled springs between said latter seats, the auxiliary springs being located between the center line of a vehicle and the first mentioned springs.

2. In a vehicle, a vehicle frame having side members, two half axles pivoted together by a longitudinal pivot and each free from the vehicle frame and transverse thereof, a spring seat swiveled by a longitudinal pivot to each half axle, a leaf spring seated on each spring seat and each spring having its ends connected to a side member of the vehicle frame.

3. In a vehicle as claimed in claim 2, an auxiliary spring for each half axle bearing at its lower end on a seat connected to the vehicle frame and at its upper end bearing on a seat connected to an inner portion of each half axle.

4. In a vehicle, a vehicle frame having two half axles each pivoted together and free from the under side of the vehicle frame, an upper spring seat attached to the portion of each half axle adjacent its pivot, a pair of lower complementary spring seats secured to said frame, a coil spring seated between each complementary pair of seats, a pair of outer springs connected to an outer portion of each half axle and each outer spring having a connection to the vehicle frame.

5. In a vehicle as claimed in claim 4, each outer spring being a leaf spring parallel to the sides of the vehicle frame and its connection to a half axle being by a spring seat swiveled to a half axle by a longitudinal pivot, and the connection of each leaf spring to the vehicle frame being at the ends of each leaf spring.

6. In a vehicle, a vehicle frame having side members, two half axles pivoted together at their inner ends by a longitudinal pivot, such pivot being free from the vehicle frame, the half axles being transverse to the vehicle frame, a spring seat pivotally connected to each half axle by a longitudinal pivot and springs in each seat connected to the side members of the vehicle frame.

7. In a vehicle as claimed in claim 6, each half axle having adjacent its pivot a first bracket formed with a vertical plate and an upper spring seat, each side member having a second bracket formed with a vertical plate attached to each side member and having a lower spring seat, and a coiled spring between the spring seats of the first and second brackets.

8. In a vehicle, a vehicle frame having side members, an axle formed of two half axle sections pivoted together at their inner ends by a longitudinal pivot, the outer ends being adapted for mounting wheels and the axle being transverse to the vehicle frame, auxiliary spring connections including a first bracket having a vertical plate secured to each of the half axles adjacent its pivot and having a horizontal extension forming an upper spring seat, each of the side members having a second bracket with a vertical plate and a horizontal extension forming a second spring seat, a coiled spring seated on the spring seats of the first and second brackets, main springs located outside of the side members, each having a lower connection to an axle section towards its outer end and an upper connection to the adjacent side member of the vehicle frame.

9. In a vehicle as claimed in claim 8, the spring seats of the first and second brackets each having a cone-shaped structure formed on the horizontal extension of the vertical plate of each of the complementary brackets, the cone sections extending towards each other and forming a centering means for the coil spring connecting the spring seats of the first and second brackets.

CHARLES OPOLO.